April 1, 1952     P. J. HARINGHUIZEN     2,591,658
PROCESS AND APPARATUS FOR THE SEPARATION OF COKE-OVEN GAS
Filed Jan. 7, 1949                   3 Sheets—Sheet 3

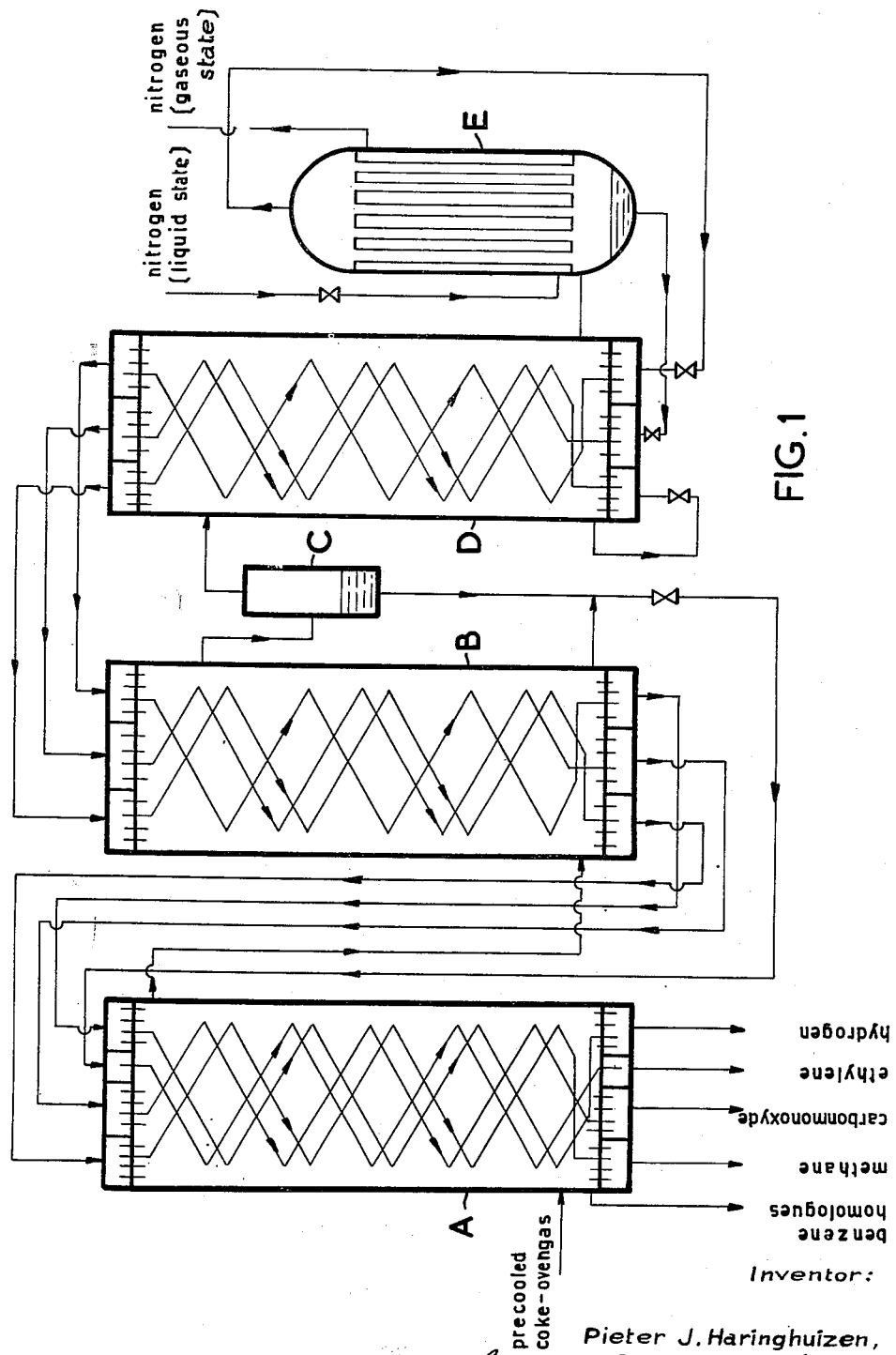

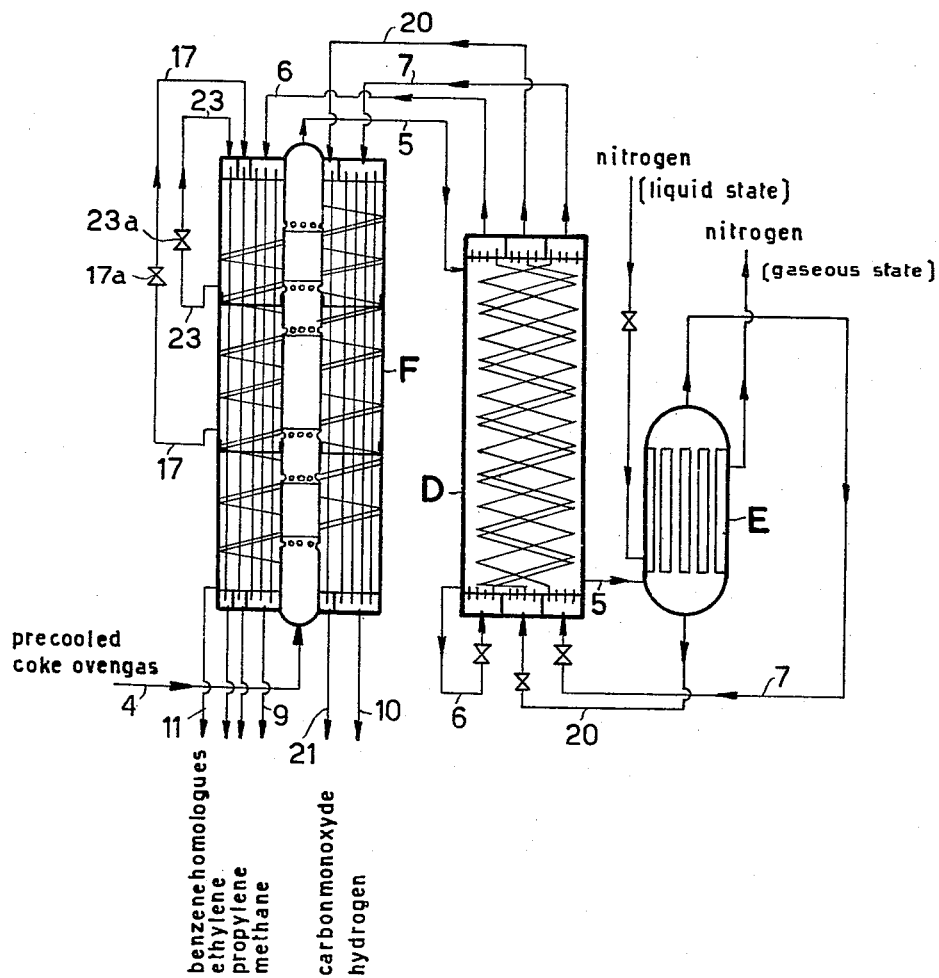

Inventor:
Pieter J. Haringhuizen,
By Cushman, Darby & Cushman
Attorneys.

Patented Apr. 1, 1952

2,591,658

UNITED STATES PATENT OFFICE 2,591,658

PROCESS AND APPARATUS FOR THE SEPARATION OF COKE-OVEN GAS

Pieter J. Haringhuizen, Geleen, Netherlands, assignor to De Directie van de Staatsmijnen in Limburg, Heerlen, Netherlands Application January 7, 1949, Serial No. 69,661
In the Netherlands January 9, 1948

4 Claims. (Cl. 62—175.5)

This invention relates to a method and apparatus for the separation of coke oven gas by cooling and partial condensation.

It is known to cool coke oven gas stage by stage with the several components being liquefied until finally only hydrogen remains in the gaseous state. Usually, the gas, maintained under a pressure between 10–30 atm., is passed through a series of countercurrent heat exchanger columns and the resulting liquefied fractions are withdrawn from the columns. In order to regain the cold present in the fractions, they are expanded and again led back through the cooling elements of the heat exchanger columns, in which they re-evaporate. Usually, such heat exchanger columns consist of a system of narrow, twisted tubes encased in a single wide tube, and the tube is embedded in lagging material. The incoming gas is passed through the interspaces between the system of twisted tubes and the resulting fractions are re-evaporated and reheated in the tubes by the incoming gas.

The two streams of incoming gas and re-evaporating liquefied fractions have a large surface of contact with the tubes and through these with one another. The cold required in the process is obtained from liquid nitrogen which evaporates and extracts the heat necessary for its evaporation from the gas. The cooling and liquefaction is carried out under pressure ranging, in the known processes, from 10–30 atm.

At a pressure of about 13 atm., the process has been carried out heretofore in the following way:

Purified coke oven gas, filled with moisture, carbon dioxide, and hydrogen sulfide, is precooled, generally in ammonia coolers, to −45°. The greater part of benzene, present in the original gas, is liquefied in the precoolers.

The precooled gas traverses three heat exchanger columns in which it is cooled by outgoing products. In the first column, the so-called "benzene column," the gas flows upwards through the heat exchanger column and its temperature is lowered to −100° C. in order to liquefy the "benzene fraction," chiefly consisting of homologues of benzene and of cyclopentadiene. This "benzene fraction" is withdrawn from the bottom, the warmest part of the column for, otherwise, this fraction will be solid and block the column parts which have a lower temperature.

The gas freed of the benzene fraction enters the lower part of the second heat exchanger column, the so-called "ethylene column." In this column, a temperature of −145° C. is finally attained and the "ethylene fraction" chiefly consists of condensed ethylene, propylene and a little methane. This "ethylene fraction" is collected in the sump of the heat exchanger column, the warmest part of the column, in order to obtain a concentrate rich in ethylene and poor in methane. However, a little part of the "ethylene fraction" is carried on by the gas flow and deposited in a trap, whereupon the gas freed from liquid drops enters the top of the third heat exchanger.

In the third heat exchanger, the temperature decreases to −180° C. and almost all of the methane is condensed. In order to remove the last traces of methane from the gas, the gas passes up through the tubes of a condenser, surrounded by liquid nitrogen boiling under atmospheric pressure. Here, it is cooled to about −190° C. and a fraction of carbon monoxide, together with the rest of the methane, is condensed. In the first and second heat exchanger columns, the condensed "benzene fraction" and "ethylene fraction" flow downwards and are contacted with the rising gas flow.

A disadvantage of this known process is that the "flooding point" of the usual heat exchanger columns, in other words, the upper limit of gas velocity at which the condensate is entrained with the gas flow, is rather low.

Objects

A principal object of this invention is the provision of a new process for the separation of coke oven gas into its separate components by cooling and partial condensation. Further objects include:

(1) The provision of a new type of heat exchanger column for the separation of coke oven gas;

(2) The provision of a new coke oven gas separation process and heat exchanger units for use therewith of considerably simplified construction, allowing for appreciable reduction in cost of coke oven gas refining plants;

(3) The provision of new coke oven gas separation columns in which the "flooding point" is relatively very high;

(4) The provision of new heat exchanger columns of unitary construction, capable of replacing three separate columns of the prior art type of apparatus;

(5) The provision of a new type of process for treatment of coke oven gas permitting sharper separation between various components present in the coke oven gas to be obtained.

Still further objects will become apparent from the detailed description given hereinafter.

Summary of invention

These objects are accomplished according to the present invention by carrying out the separation of coke oven gas in a separation plant, in which the commonly applied "benzene column" and following "ethylene column" are combined to one heat exchanger column, which column is constructed of a tubular casing, a central core extending longitudinally therein, a helical wall surrounding said core and extending from the latter to the casing to constitute a helical cavity about said core, a multitude of hollow cooling elements extending substantially co-axially with said core through said helical partition, headers communicating with the ends of said cooling elements, one or more partitions in said helical cavity extending from the casing to the core and dividing the heat exchanger column into separate upper and lower helical compartments, interconnection means between said compartments permitting the passage of gas and condensate from one to the other compartment, an inlet opening for the coke-oven gas, an outlet opening for withdrawing the cooled gas and means for withdrawing the condensates from the bottoms of the helical compartments.

Using this new heat exchanger column in a plant for separating coke oven gas instead of the commonly applied two heat exchanger columns, namely, the so-called "benzene column" and "ethylene column," several advantages are obtained. For example, 30% of heat exchanging surface has been saved; losses due to imperfect insulation are considerably lower than compared with the use of the separated two columns, and less energy (this means less liquid nitrogen) is necessary for the coke oven gas separation.

Due to the particular construction of the column of this invention, the "flooding point" lies considerably higher as compared with the commonly used heat exchanger columns and, consequently, the gas velocity in this new type column may be increased before flooding occurs, thus the heat transfer per unit time is increased too, and for a given heat transfer capacity, a much smaller heat exchanging surface can be employed.

Due to this feature, the commonly applied "benzene column" and "ethylene column" may be replaced by one single column of the said particular construction, without the length of the column being increased to such an extent that, in view of the admissable height, difficulties would be encountered when inserting the combined column in normal plants.

A still further advantage of the new heat exchanger column is the possibility to arrange that the condensate from the upper compartment flows into a lower compartment, which compartment has a higher temperature. As a result of this operation, the liquefying process in the column resembles that which takes place in a rectifying column. Consequently, a sharper separation between the several hydrocarbons, present in the original coke oven gas, may be obtained.

Preferably the column, according to this invention, is divided, by two partitions, into three compartments; in the upper compartment ethylene is liquefied, in the lower compartment the "benzene fraction" and the intermediate makes it possible to liquefy a separate "propylene fraction."

The column may be constructed in such a way that the coke oven gas will pass from one compartment to another through openings in the central core above and below the partition separating the compartments, which openings also serve to pass an overflow of condensate from an upper to a lower section, notwithstanding the very high velocity of the gas which is passing through the openings.

Brief description

In order that the invention will be more readily understood, reference is made to the drawings, in which Figure 1 is a diagrammatic plan view of a common, known coke oven gas separation plant;

Figure 2 is a diagrammatic view of a coke oven gas separation plant according to this invention, using a single heat exchanger column of particular construction;

Detailed description

In Figure 1, the precooled coke oven gas, maintained under pressure, enters column A, flows along the twisted cooling tubes and a "benzene fraction" is liquefied, whereupon the gas enters column B, in which column the temperature is further lowered and an "ethylene fraction" is liquefied.

Due to the high gas velocity, a part of the liquefied "ethylene fraction" is carried on by the gas flow and deposited in a trap C. The gas freed of liquid enters the top end of column D, in which column the greatest part of methane is liquefied. Finally, the uncondensed gas passes up through the tubes of condenser E, which are surrounded by liquid nitrogen boiling under atmospheric pressure.

From the top of the condenser is obtained uncondensed hydrogen with some carbon monoxide and liquefied carbon monoxide mixed with methane is withdrawn from the bottom. The liquefied fractions are expanded and led back through the twisted cooling tubes of heat exchanger columns A, B and D.

Figure 4:
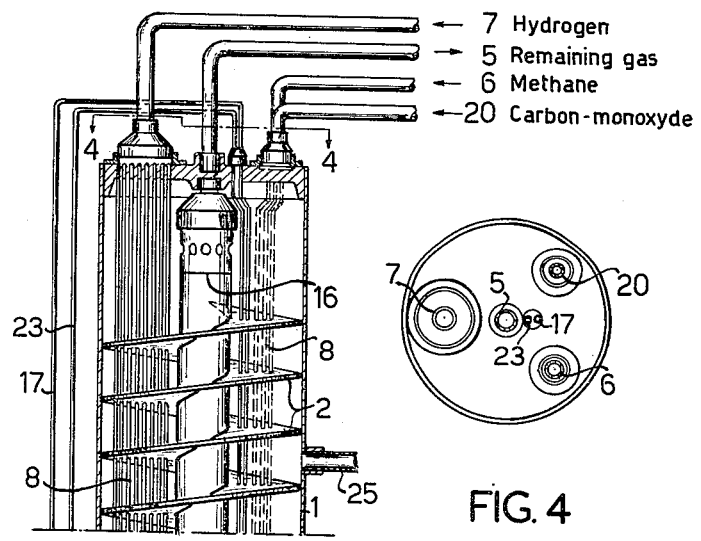
Figure 4 represents a top sectional view of the column of Figure 3, taken along the line 4—4 of Figure 3.
Figure 3:
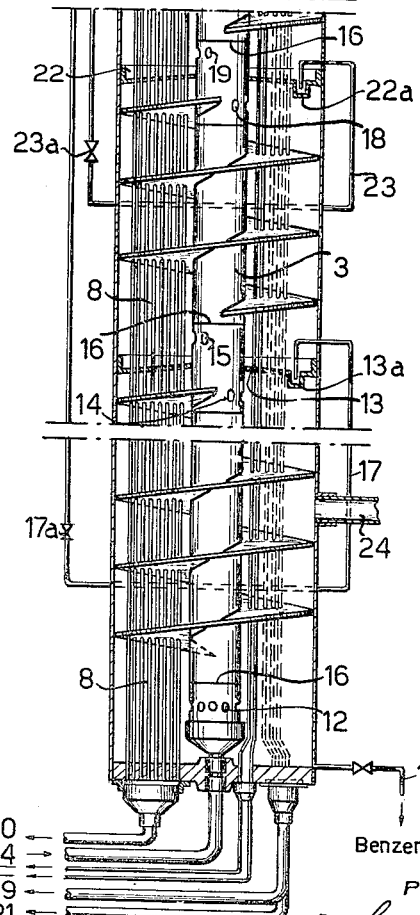
Figure 3 is a sectional side view of the heat exchanger column according to this invention and diagrammatically shown in Figure 2.

The heat exchanger columns A and B and trap C, shown in Figure 1, are according to the invention in Figure 2 replaced by one single heat exchanger column F of particular construction, which construction is more clearly shown in Figures 3 and 4.

In Figure 2, the precooled coke-oven gas, maintained under pressure, enters column F, in which successively a "benzene fraction," a "propylene fraction" and an "ethylene fraction" are liquefied. Thereupon, the uncondensed gas enters successively column D and condenser E, just as shown in Figure 1.

The condensing column shown in Figure 3 comprises a cylindrical outer casing 1 having helical walls 2 extending between the casing and a hollow central cylindrical core 3. In the lower portion of the apparatus, there is located a transverse partition 13 extending from the casing 1 to the core 3 and a similar partition 22 is disposed in the top part of the apparatus. The condensing column is thereby divided into an upper, an intermediate and a lower compartment, each including a helical cavity extending substantially from end to end thereof between the casing 1 and core 3. (To simplify the drawing, the insulating layer covering the wall 1 has been omitted.)

A multiplicity of cooling pipes 8, a few of which only are shown (and those incompletely), are arranged longitudinally end to end of the casing 1 from headers at the ends thereof; the pipes 8 passing in a liquid-tight manner through the convolutions of the helical walls 2 and the transverse partitions 13 and 22.

The precooled coke oven gas is introduced into the base of the hollow core 3 through an inlet pipe 4. The coke oven gas then passes into the helical cavity of the lower compartment through opening 12 in the wall of the core 3 at its lower end and ascends through the helical cavity passing repeatedly and substantially transversely around the cooling pipes 8. Inlet pipes 6, 7 and 20 are connected to separate headers, as shown at the head of the column, which are respectively connected to separate groups of the pipes 8. The pipes 6, 7, and 20 are supplied with cooling agents, respectively comprising methane, hydrogen and carbon monoxide, which have been obtained in next-cooling operations of the coke oven gas. The cooling agents pass downwardly through the groups of pipes 8, countercurrent to the gas ascending in the helical cavities and are withdrawn through pipes 9, 10 and 21, connected to the headers at the base of the column.

At the top of the lower compartment of the column, immediately below the partition 13, the core 3 is provided with openings 14 in its wall through which the gas again flows into the hollow core. Further openings 15 are provided in the wall of the core 3, above the partition 13, close thereto, through which the gas may pass into the lower part of the intermediate compartment. At the top of the intermediate compartment, the gas encounters the partition 22 and then again passes into the hollow core 3 through openings 18 to by-pass the partition, flowing out again via opening 19 above the partition into the upper compartment. Towards the top of the upper compartment, the gas again flows into the core 3 through openings 24 and then out of the column by way of a take-off pipe as shown. Transverse diaphragms 16 are provided inside the hollow core 3, at the various locations indicated in Figure 3, adjacent to the openings 12, 14, 15, 18, 19 and 24 to constrain the gas to follow the circuitous path described.

In the employment of the above apparatus as a combined benzene-ethylene column, the so-called benzene fraction is condensed within the lower compartment and may be withdrawn from the bottom thereof, through a pipe 11. In the intermediate compartment, a propylene fraction undergoes condensation and collects above the partition 13 which is formed with a well portion 13a, as shown. The propylene fraction is withdrawn through a conduit 17 having an open end dipping into the well 13a, the conduit 17 extending in a siphon tube arrangement through the casing 1 and being connected at its other end to part of the pipes 8 at the upper end of the column. The propylene fraction, withdrawn from above the partition 13, is accordingly expanded in the conduit 17 by means of valve 17a, externally of the casing 1, serves as an additional cooling agent in the column, and is then discharged through a take-off pipe at the base of the column. Similarly, the ethylene fraction, condensed in the upper compartment, collects upon the partition 22, which is provided with a well portion 22a and is withdrawn through a conduit 23 connected to a different part of the pipes 8 and the head of the column. The ethylene fraction also undergoes expansion in the pipe 23 by means of valve 23a and serves as an additional cooling agent in the column and is discharged through a take-off pipe at the base thereof.

Additional supply and discharge pipes 24 and 25, respectively, for the gas open through the wall of the casing 1 into the lower and upper compartments by means of which it is possible to vary the effective area of the heat exchange surface.

It will be observed that the openings 15 and 19 are disposed at such a level above the partitions 13 and 22, respectively, as to afford a reservoir for condensate between the casing, the core and each partition below the openings which then constitute overflow passages to the compartments below. By this arrangement, the process of condensation in the lower compartments may be controlled.

EXAMPLE

In a specific operation, the coke oven gas was supplied to the column at a temperature of —50° C., the propylene condensate above the partition 13 was at a temperature of approximately —80° C. and the ethylene condensate above the partition 22 was at approximately —110° C., while the gas was discharged from the column at —140° C.

The height of such a combined column, having a capacity of 13,000 cubic meters of gas per hour, amounts to approximately 11 meters, measured from the service platforms.

I claim:

1. Process for the separation of coke-oven gas into several fractions by cooling and successive liquefaction of these fractions, which consists in using the obtained liquefied fractions after expansion and re-evaporation as cooling agents and passing said cooling agents downwardly through a plurality of cooling elements in a heat exchanger, passing a precooled coke-oven gas of about —45° C. upwardly in a helical path divided into a plurality of separate, successive condensation zones along and around said cooling elements, whereby the coke-oven gas is brought into repeated, substantially transverse contact with the cooling elements and condensation is brought about in each of the said condensation zones, collecting said condensed fractions on the bottoms of said zones, withdrawing said fractions from the bottoms of said zones, withdrawing uncondensed gas from the top of said heat exchanger, passing this gas downwardly through a second heat exchanger, wherein the gas is further cooled in order to liquefy the greater part of the methane, withdrawing the uncondensed gas from the said second heat exchanger and passing the gas through a condenser in which the gas is cooled by boiling nitrogen, withdrawing a liquefied fraction composed of carbon monoxide and methane from the bottom of this condenser, and a gas substantially consisting of hydrogen from the top of the condenser.

2. Process according to claim 1, characterized by the fact that parts of the collected liquid fractions, condensed in one zone, are brought into another condensation zone having a higher temperature, in order to influence the condensation of the coke oven gas.

3. Apparatus for the separation of coke oven gas according to the process of claim 1, consisting of two heat exchanger columns and one condenser in series, the first heat exchanger column comprising a tubular casing, a central, preferably hollow core extending longitudinally therein, a helical wall surrounding said core and extending from the latter to the casing to constitute a helical cavity about said core, a multitude of hollow cooling tubes, extending substantially coaxially with said core through said helical partition, headers communicating with the ends of said cooling elements, at least one partition in said helical cavity extending from the casing to the core and dividing the heat exchanger column into separate upper and lower helical compartments, inter-connection means between said compartments permitting the passage of fluid from one to the other compartments, an inlet opening for gaseous medium in the lower end of the column, an outlet opening for withdrawing cooled gaseous medium at the upper end of the column, and discharge conduits for the condensates collected on the bottom of the said upper and lower helical compartments.

4. Apparatus according to claim 3, wherein helical compartments are connected by means of openings in the wall of the central hollow core.

PIETER J. HARINGHUIZEN.

REFERENCES CITED

The following references are of record in the file of this patent:

UNITED STATES PATENTS

| Number | Name | Date |
|---|---|---|
| 1,454,053 | Jones | May 8, 1923 |
| 1,620,192 | Claude | Mar. 8, 1927 |
| 1,724,513 | Pollitzer | Aug. 13, 1929 |
| 1,865,135 | Pollitzer et al. | June 28, 1932 |
| 2,389,636 | Ramseyer | Nov. 27, 1945 |

FOREIGN PATENTS

| Number | Country | Date |
|---|---|---|
| 12,416 | Netherlands | Feb. 16, 1925 |
| 18,698 | Great Britain | 1910 |
| 551,358 | Germany | May 30, 1932 |